April 9, 1940. L. M. DE BOLT 2,196,626
THROTTLE CONTROL
Filed Aug. 1, 1939 2 Sheets-Sheet 1
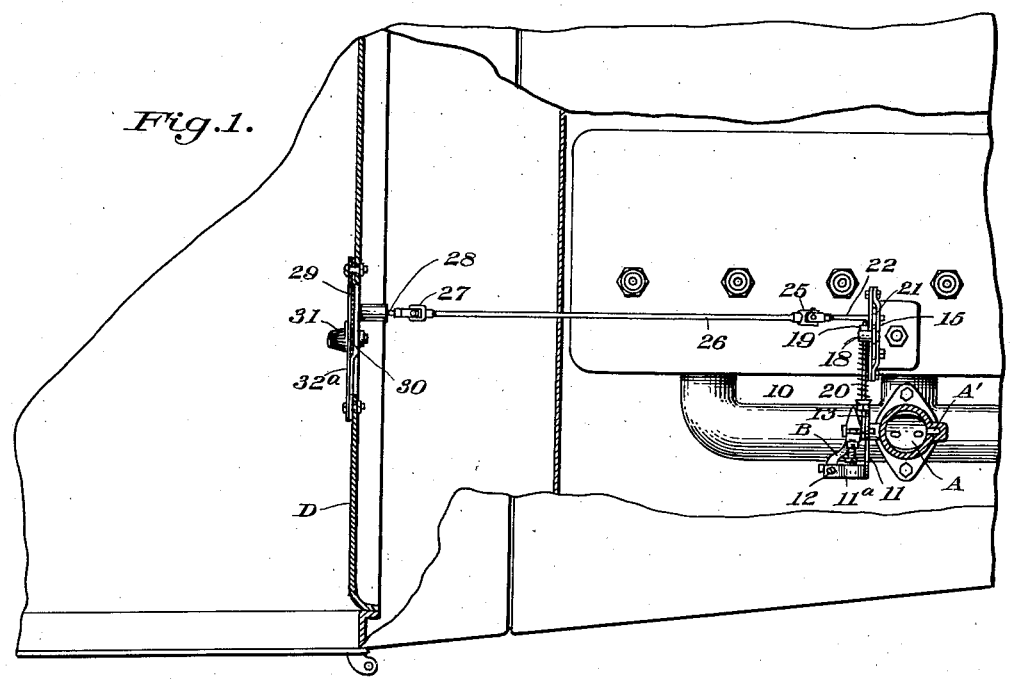
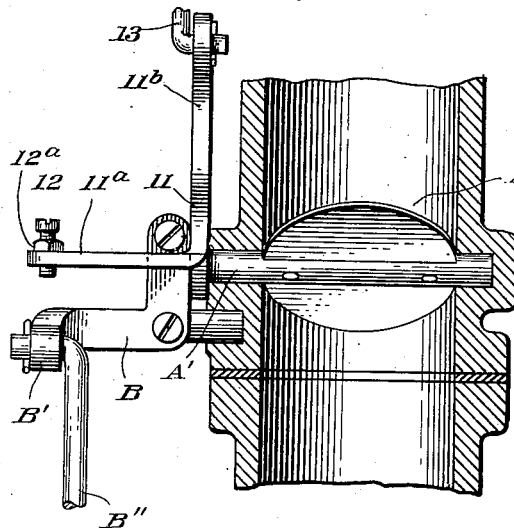
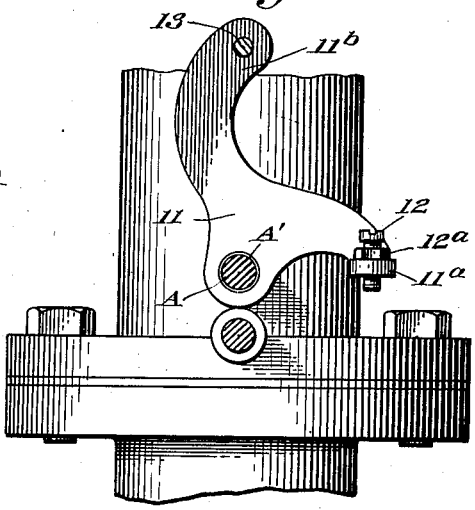
Leo M. De Bolt:
INVENTOR
ATTORNEYS April 9, 1940. L. M. DE BOLT 2,196,626
THROTTLE CONTROL
Filed Aug. 1, 1939   2 Sheets-Sheet 2
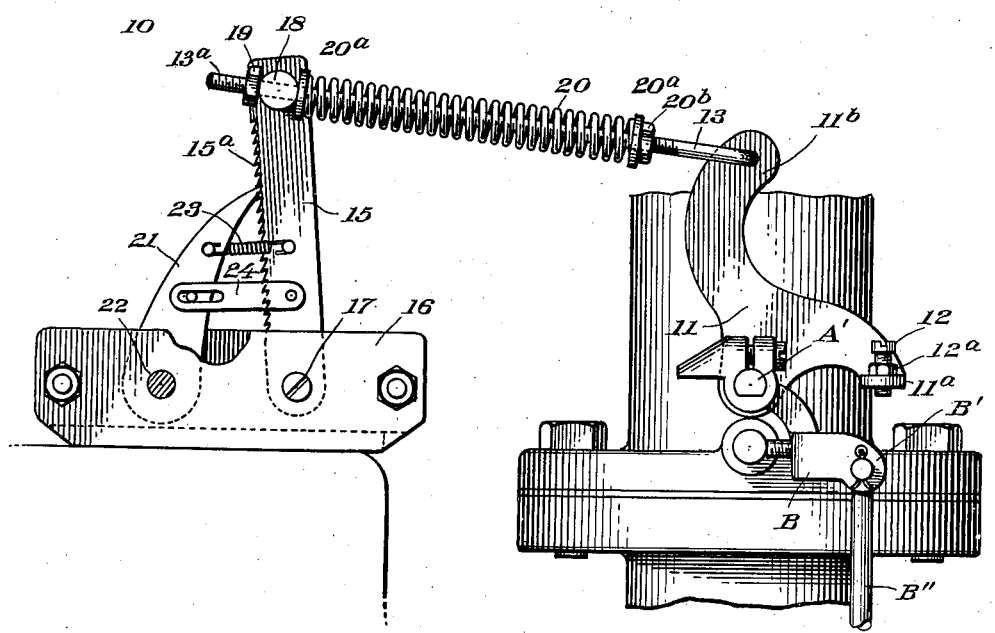
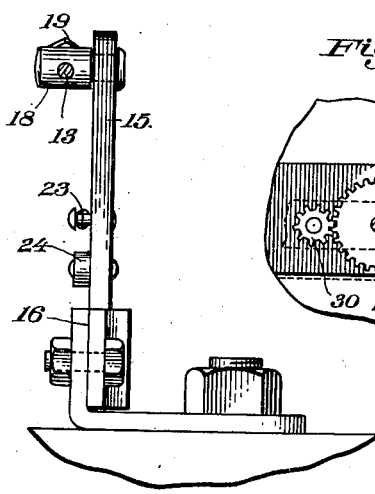
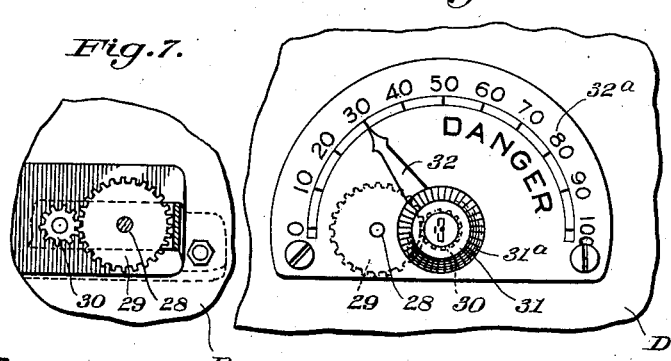
Leo M. De Bolt,
INVENTOR
BY Victor J. Evans & Co.
ATTORNEYS Patented Apr. 9, 1940

2,196,626

UNITED STATES PATENT OFFICE 2,196,626

THROTTLE CONTROL

Leo M. De Bolt, Columbia City, Ind.

Application August 1, 1939, Serial No. 287,815

3 Claims. (Cl. 74—526)

This invention relates to improvements in accelerator controls especially for vehicles and the like.

It is an object of the invention to provide means for facilitating the control of acceleration in a manner such that operation of the vehicle at a higher than selected speed except in emergencies is substantially precluded.

Another object of this invention is to provide an accelerator control which can be attached to existing types of vehicles whereby, to regulate operation of the vehicle in a manner precluding or at least minimizing likelihood of violation of speed laws.

A feature of the device according to the instant invention is its comparative simplicity and ruggedness of construction which, in the first instance suits it well to the requirements of mass production, and in the second instance minimizes likelihood of failure during use or of necessity of expensive repairs.

An advantage of the accelerator control device according to this invention over certain existing types of accelerator control is that it can be readily and quickly adjusted to the selected speed limit by operation of a dashboard control, whereas in other types of accelerator control now in use the hood of the engine must be raised and complicated and/or delicate adjustment of the carburator must be made.

Other objects, advantages and features of the new and improved accelerator control according to the present invention will be apparent to those skilled in this art during the course of the following description.

Regarded in certain of its broader aspects, the novel accelerator control according to this invention comprises an arm freely rotatably mounted upon the accelerator valve shaft adjustable in a selected position and adapted to engage with and stop rotation of the valve shaft opening the valve.

In order to facilitate a fuller and more complete understanding of the present invention a specific embodiment thereof herein illustrated will be hereinafter described, it being clearly understood, however, that the illustrated embodiment, although presently preferred, is provided solely by way of example of the practice of this invention and not by way of limitation thereof except insofar as the invention is recited in the subjoined claims.

Referring then to the drawings,

Figure 1 is substantially a top plan view of the presently preferred embodiment of this invention showing same mounted for use upon conventional parts of a vehicle, Fig. 2 is essentially a side elevational view of the preesntly preferred embodiment of accelerator control according to the instant invention illustrating same in conjunction with parts of a conventional throttle, Fig. 3 is a front elevational view partially in section of the control levers showing same mounted upon a conventional throttle, Fig. 4 is a side elevational view of the structure shown in Fig. 3 with one of the control levers removed, Fig. 5 is a front elevational view of a portion of the control mechanism, Fig. 6 is a front elevational view of the control dial mechanism, and Fig. 7 is a fragmentary detail view of a part of the dial mechanism.

Referring now to the figures of the drawings, it will be noted that the novel accelerator valve control according to the present invention generally designated by the numeral 10 comprises an elbow lever 11 freely rotatably mounted at the juncture of its arms on the accelerator valve shaft A' of the accelerator valve generally designated by the letter A. One of the arms 11a of the elbow lever 11 is bent outwardly in a direction essentially parallel to the axis of motion of the elbow substantially as shown and carries adjustably mounted in the free end thereof a stop screw 12 which is provided with a lock-nut 12a for facilitating retaining of the stop screw in a selected position. The accelerator valve is operated by the arm B pivotally connected at the end B' thereof to the rod B'' whereby the valve may be opened and, upon occasion, closed. During the opening of the valve the portion B' of the arm B strikes against and is restrictingly engaged with the stop screw 12 carried on the portion 11a of the elbow lever 11. It will be evident from the foregoing that free full opening of the accelerator valve is dependent in a measure upon the position of the elbow lever 11.

A connector rod 13 pivotally mounted in the end portion 11b of the elbow lever 11 extends therefrom substantially as shown and is connected with other parts of the device which now will be described. A straight lever arm 15 toothed along one edge 15a thereof is mounted in the bracket 16 by the screw 17 in a manner such that free swinging motion of the lever arm is not precluded. A rod receiving member 18 pivotally mounted in the distal free end of the arm 15 slidingly receives the end portion 13a of the connector rod 13. The connector rod 13 is threaded throughout a major portion of the length thereof and the end part of the rod is provided with an internally threaded collar 19 for retaining portions of the rod within the rod receiving member 18. A helical spring 20 positioned between washers 20a and compressible by means of the internally threaded collar 20b presses the collar 19 against the rod receiving member 18 whereby the several structural elements of the device occupy essentially the relative positions illustrated in the figures of the drawings.

A pawl 21 carried on the shaft 22 journaled in the bracket 16 engages the toothed edge portion 15a of the straight lever arm 15 being urged thereagainst by the spring 23 attached to the pawl and the lever arm. A connector element 24 attached to the straight lever arm 15 and to the pawl 21 serves to draw the lever after the pawl when the last mentioned is moved out of engagement with the toothed portions of the lever. The shaft 22 carrying the pawl 21 is connected through the flexible couplings 25 and 27 and the connector rod 26 to the shaft 28 upon which is mounted the gear 29 meshing with the gear 30 which in turn is carried upon and rotatable by the knob 31 mounted on the dashboard D of the vehicle substantially as shown. It is to be noted that the knob 31 is provided with a lock 31a for fixing same in a selected position and, for convenience in determining the position of the knob, a pointer 32 cooperating with a dial 32a is provided.

Having described the structural features of the device according to the preferred embodiment of this invention, its mode of operation now will be described. Assuming for instance that it is desired to preclude or at least inhibit operation of the car at a speed not in excess of thirty miles per hour, the pointer 32 is adjusted by means of a knob 31 to the proper relationship with respect to the scale 32a and thereafter the knob is locked in position by the lock 31a. Rotation of the knob with concomitant rotation of the gear 30 and meshing gear 29 causes rotation of the shaft 22 whereby the pawl 21 is rotated through an arc and the straight lever arm 15 is drawn thereafter, it being understood of course that when at position of rest the pawl 21 engages with the toothed edge portion 15a of the lever arm 15. As the lever arm 15 moves, its motion is transmitted through the connector rod 13 to cause rotation of the elbow lever 11 whereby the position of the adjustable stop screw 12 is altered. When the operator attempts to accelerate the vehicle to a degree exceeding the value indicated by the pointer upon the graduated scale, the portion B' of the arm B abuts against and is resistingly engaged by the stop screw 12 whereby further opening of the valve A is inhibited. In the event of emergency the valve A can be further opened by pressing the portion B' of the arm B with greater force against the stop screw 12 under which conditions the spring 20 will be compressed and the valve opened more fully than when the spring is not so compressed.

Having thus described the present invention, what it is desired to secure by Letters Patent is:

1. An accelerator valve control comprising an elbow lever freely rotatably mounted upon the accelerator valve shaft and engaging with the valve operating lever during the opening of the valve; and a ratchet and pawl lever system for adjustably rotating said elbow lever to inhibit at different positions the opening of the valve.

2. An accelerator valve control comprising an elbow lever freely rotatably mounted on the accelerator valve shaft; an adjustable stop on said lever restrictively engaging with the valve operating lever during opening of the valve; a straight lever arm toothed along one edge swingably mounted near the accelerator valve; a connector element pivotally attached to said elbow lever and with the free end of said straight lever; a pawl, spring-urged toward and engaging the toothed edge of said straight lever arm; a connector element joining said straight lever arm and said pawl for drawing the lever after the pawl when same is moved out of engagement with the toothed edge of the lever; and means for adjustably swinging said pawl.

3. An accelerator valve control comprising an elbow lever pivotally mounted at the juncture of its arms on the accelerator valve shaft; an adjustable stop screw, mounted near the free end of one of said arms, restrictively engaging with the valve operating lever during opening of the valve; a connector rod pivoted to the free end of the other of said arms; a straight lever arm toothed along one edge, swingably mounted at one end near the accelerator valve; a rod-receiving member pivotally mounted near the free distal end of said straight lever arm for slidingly receiving said connector rod; an adjustable collar on said connector rod between the rod-receiving member and the free end thereof; a helical spring, sleeved on said rod yieldingly urging said collar against said member; a pawl, spring-urged toward and engaging the toothed edge of said straight lever arm; and a connector element attached to said straight lever arm and to said pawl for drawing the lever after the pawl when same is moved out of engagement with the toothed edge of the lever.

LEO M. DE BOLT.